(12) United States Patent  (10) Patent No.: US 8,817,177 B2
Yasuda  (45) Date of Patent: Aug. 26, 2014

(54) METHOD OF CONTROLLING DIGITAL IMAGE PROCESSING APPARATUS, DIGITAL IMAGE PROCESSING APPARATUS APPLYING THE METHOD, AND COMMUNICATION SYSTEM INCLUDING THE DIGITAL IMAGE PROCESSING APPARATUS

(75) Inventor: Tomonaga Yasuda, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 13/220,874

(22) Filed: Aug. 30, 2011

(65) Prior Publication Data

US 2012/0051448 A1 Mar. 1, 2012

(30) Foreign Application Priority Data

Aug. 30, 2010 (KR) ........................ 10-2010-0084350

(51) Int. Cl.
*H04N 5/225* (2006.01)
(52) U.S. Cl.
USPC ................ 348/375; 348/372; 710/33; 710/35
(58) Field of Classification Search
USPC .................. 348/207.99, 372, 375; 710/35, 33
See application file for complete search history.

(56) References Cited

U.S. PATENT DOCUMENTS

| | | | | |
|---|---|---|---|---|
| 6,434,643 | B1 * | 8/2002 | Ejiri ................................ | 710/58 |
| 6,850,995 | B1 * | 2/2005 | Shishizuka et al. ............. | 710/20 |
| 8,041,855 | B1 * | 10/2011 | Ou et al. .......................... | 710/35 |
| 2002/0059491 | A1 * | 5/2002 | Date et al. ...................... | 710/240 |
| 2005/0125589 | A1 * | 6/2005 | Feng .............................. | 710/313 |
| 2005/0210164 | A1 * | 9/2005 | Weber et al. .................... | 710/35 |
| 2007/0055813 | A1 * | 3/2007 | Ingram et al. .................. | 711/100 |
| 2010/0217924 | A1 * | 8/2010 | Panabaker et al. ............. | 711/103 |
| 2010/0272162 | A1 * | 10/2010 | Simeon et al. ................. | 375/220 |
| 2011/0231685 | A1 * | 9/2011 | Huang et al. ................... | 713/321 |

* cited by examiner

*Primary Examiner* — Paul Berardesca
(74) *Attorney, Agent, or Firm* — Drinker Biddle & Reath LLP

(57) ABSTRACT

Provided are methods of controlling digital image processing apparatus, in which a communication method may be transitioned to burst communication when an amount of data for communication with an external device is great, digital image processing apparatuses to which the methods are applied, and communication systems including the digital image processing apparatuses. In the methods, according to a type or a state of an external device or an operating state of the digital image processing apparatus, when an amount of data to be transmitted is large, burst communication may be performed, and if the amount of data is not as large, single communication may be performed.

32 Claims, 14 Drawing Sheets

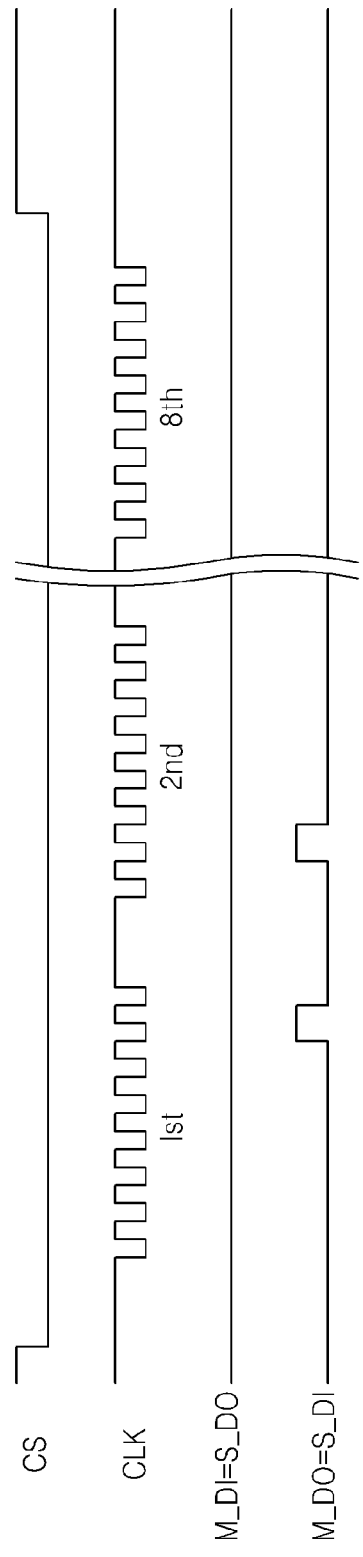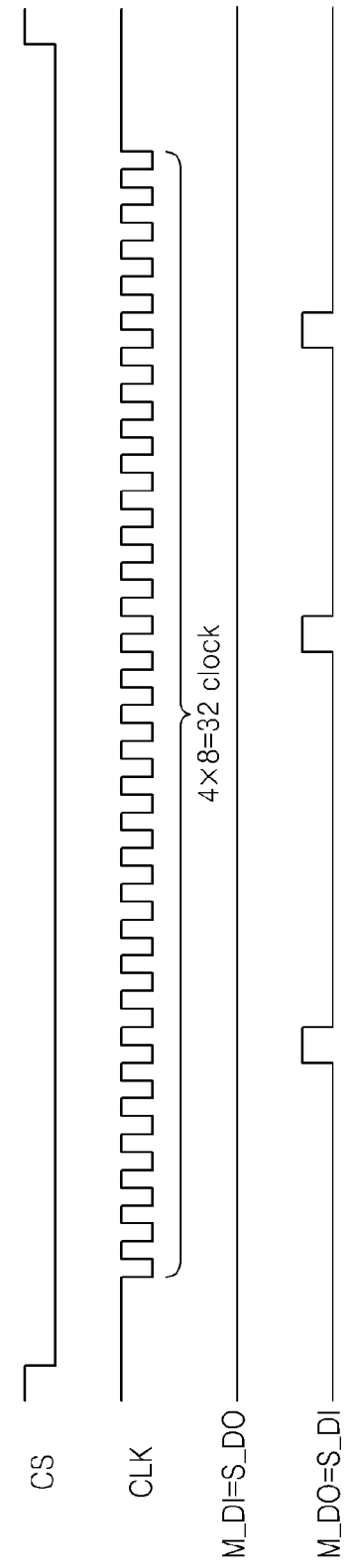

FIG. 13A

| Signal Name | Data Size | Address | Data Contents | | | | | | | | Note |
|---|---|---|---|---|---|---|---|---|---|---|---|
| | | | bit7 | bit6 | bit5 | bit4 | bit3 | bit2 | bit1 | bit0 | |
| TO BURST | 8bit | BU_0[0:7] | 0 | 1 | 1 | 0 | 0 | 0 | 1 | 0 | This command is issued when starting Burst Communication.. |

FIG. 13B

| Signal Name | Data Size | Address | Data Contents | | | | | | | | Note |
|---|---|---|---|---|---|---|---|---|---|---|---|
| | | | bit7 | bit6 | bit5 | bit4 | bit3 | bit2 | bit1 | bit0 | |
| TO 8byte | 8bit | BU_0[0:7] | 0 | 0 | 1 | 1 | 1 | 0 | 0 | 0 | This command is issued when starting 8Byte Communication.. |

FIG. 13C

| Signal Name | Data Size | Address | Data Contents | | | | | | | | Note |
|---|---|---|---|---|---|---|---|---|---|---|---|
| | | | bit7 | bit6 | bit5 | bit4 | bit3 | bit2 | bit1 | bit0 | |
| TO FWUP | 8bit | BU_0[0:7] | 1 | 0 | 1 | 0 | 1 | 0 | 1 | 0 | This command is issued when starting FW Update Communication.. |

FIG. 14A

| Signal Name | Data Size | Address | Data Contents bit7 | bit6 | bit5 | bit4 | bit3 | bit2 | bit1 | bit0 | Note |
|---|---|---|---|---|---|---|---|---|---|---|---|
| VER | 3bit | BU_0[0:2] | | | | | | | | | Camera version. Normally 000b. |
| OFFTIME | 3bit | BU_0[3:5] | | | | | | | | | Power Off Time. When passing this time with no CE line signal, unit goes power off mode. ooob=none, 001b=10min, 010=20min, ..., 111b=70min. |
| - | 2bit | BU_0[6:7] | | | | | | | | | Reserved. |
| POW | 1bit | BU_1[0] | | | | | | | | | Power on/off Command. 0b=off, 1b=0n. |
| SRESET | 1bit | BU_1[1] | | | | | | | | | System Reset Command. 0b=normal, 1b=do resetting. |
| SLEEP | 1bit | BU_1[2] | | | | | | | | | Sleep Command. 0b=normal, 1b=go sleep mode. |
| DRESET | 1bit | BU_1[3] | | | | | | | | | Data Reset Command. 0b=normal, 1b=reset data. |
| DTYPE | 1bit | BU_1[4] | | | | | | | | | only. |
| DBG | 1bit | BU_1[5] | | | | | | | | | Debug flag. 0b=normal mode, 1b=debug mode. |
| VLD | 2bit | BU_1[6] | | | | | | | | | Data validation flag for BU_2~BU_7. 0b=BU_2~BU_7 data is invalid and must be ignored despite any correct data, 1b=BU_2~BU7 data is valid and must be. |
| | 2bit | BU_1[7] | | | | | | | | | Reserved. |
| | 8bit | BU_2[0:7] | | | | | | | | | Reserved. |
| | 8bit | BU_3[0:7] | | | | | | | | | Reserved. |
| | 8bit | BU_4[0:7] | | | | | | | | | Reserved. |
| | 8bit | BU_5[0:7] | | | | | | | | | Reserved. |
| | 8bit | BU_6[0:7] | | | | | | | | | Reserved. |
| | 8bit | BU_7[0:7] | | | | | | | | | Reserved. |

FIG. 14B

| code-name | bit7 | bit6 | bit5 | bit4 | bit3 | bit2 | bit1 | bit0 |
|---|---|---|---|---|---|---|---|---|
| BU_0 | Reserved | | OFFTIME | | | VER | | |
| BU_1 | Rsvd | | DBG | Rsvd | DRESET | SLEEP | SRESET | POW |
| BU_2 | Reserved | | | | | | | |
| BU_3 | Reserved | | | | | | | |
| BU_4 | Reserved | | | | | | | |
| BU_5 | Reserved | | | | | | | |
| BU_6 | Reserved | | | | | | | |
| BU_7 | Reserved | | | | | | | |

FIG. 15A

| Signal Name | Data Size | Address | Data Contents bit7 bit6 bit5 bit4 bit3 bit2 bit1 bit0 | Note |
|---|---|---|---|---|
| FLON | 1bit | UB_0[0] | | 0b=off, 1b=on |
| - | 1bit | UB_0[1] | | Reserved. |
| FLVER | 3bit | UB_0[2:4] | | ooob, if protocol is updated, this will be incremented by 1. |
| TYPE | 3bit | UB_0[5:7] | | 110b fixed. |
| BURST | 1bit | UB_1[0:1] | | burst support. 0b=not supported, 1b=supported |
| KHZ | 3bit | UB_1[2:4] | | possible maximum speed. 000b=250kHz, 001b=500kHz, 010b=1MHz. 011b=2MHz, others are reserved |
| PERB | 4bit | UB_1[4:7] | | possible maximum byte number to be sent per 1 CE=LOW cycle. 0000b=8byte, 0001b=16byte, 0010b=32byte, 0011b=64byte, 0100b=128byte, 0101b=256byte, 0110b=512byte, 0111b=1024byte, 1000b=2K byte, 1001b=4K byte, 1010b=8K byte, 1011b=16K byte, 1100b=32K byte, 1101b=64K byte, 1110b=128K byte. |
| INTRVL | 3bit | UB_2[0:2] | | possible maximum period time to restart communication. 000b=100msec, 001b=50msec, 010b=30msec, 011b=20msec, 100b=10msec, others are reserved |
| FWVER | 5bit | UB_2[3:7] | | FW Version. |
| STATUS | 4bit | UB_3[0:3] | | System Status. 0000b=system/function initializing, 0001b=application data preparing, 0010b=application data ready, 0011b=application data updated, 0100b=sleep, 1111b=fatal error. 0101b~1110b=reserved. |
| PRODID | 4bit | UB_3[4:7] | | Product ID. Currently, 0000b fixed. This will be incremented by 1 for the next same kind of product. |
| - | 8bit | UB_4[0:7] | | Reserved. |
| - | 8bit | UB_5[0:7] | | Reserved. |
| - | 8bit | UB_6[0:7] | | Reserved. |
| - | 8bit | UB_7[0:7] | | Reserved. |

FIG. 15B

| code-name | bit7 | bit6 | bit5 | bit4 | bit3 | bit2 | bit1 | bit0 |
|---|---|---|---|---|---|---|---|---|
| UB_0 | TYPE | | | | FLVER | | Rsvd | FLON |
| UB_1 | PERB | | | | KHZ | | | BURST |
| UB_2 | FWVER | | | | INTRVL | | | |
| UB_3 | PRODID | | | | STATUS | | | |
| UB_4 | Reserved | | | | | | | |
| UB_5 | Reserved | | | | | | | |
| UB_6 | Reserved | | | | | | | |
| UB_7 | Reserved | | | | | | | |

FIG. 16A

| 1st Byte | 2nd Byte | 3rd Byte | 4th Byte | 5th Byte | 6th Byte | ... | "PERB-1"th Byte | "PERB"th Byte |
|---|---|---|---|---|---|---|---|---|
| Length(MSB) | Length | Length | Length(MSB) | 1st Data | 2nd Data | ... | "PERB-5"th Data | "PERB-4"th Data |
| Total Length (includes length of itself) | | | | Actual Data | | | | |

FIG. 16B

| 1st Byte | 2nd Byte | 3rd Byte | 4th Byte | 5th Byte | 6th Byte | ... | "PERB-1"th Byte | "PERB"th Byte |
|---|---|---|---|---|---|---|---|---|
| "PERB-3"th Data | "PERB-2"th Data | ... | ... | ... | ... | ... | "2×PERB-5"th Data | "2×PERB-4"th Data |
| Actual Data | | | | | | | | |

FIG. 16C

| 1st Byte | 2nd Byte | 3rd Byte | 4th Byte | 5th Byte | 6th Byte | ... | "PERB-1"th Byte | "PERB"th Byte |
|---|---|---|---|---|---|---|---|---|
| ... | ... | ... | ... | ... | ... | ... | ... | ... |
| Actual Data | | | | | | | | |

FIG. 16D

| 1st Byte | 2nd Byte | 3rd Byte | 4th Byte | 5th Byte | 6th Byte | ... | "PERB-1"th Byte | "PERB"th Byte |
|---|---|---|---|---|---|---|---|---|
| "Total Length-3"th Data | "Total Length-2"th Data | "Total Length-1"th Data | "Total Length"th Data | Check Sum | Dymmy Data | ... | Dymmy Data | Dymmy Data |
| Actual Data | | | Check Sum | | Dymmy | | | |

…

METHOD OF CONTROLLING DIGITAL IMAGE PROCESSING APPARATUS, DIGITAL IMAGE PROCESSING APPARATUS APPLYING THE METHOD, AND COMMUNICATION SYSTEM INCLUDING THE DIGITAL IMAGE PROCESSING APPARATUS

CROSS-REFERENCE TO RELATED PATENT APPLICATION

This application claims the benefit of Korean Patent Application No. 10-2010-0084350, filed on Aug. 30, 2010, in the Korean Intellectual Property Office, the entire disclosure of which is incorporated herein by reference.

BACKGROUND

1. Field of the Invention

The invention relates to methods of controlling digital image processing apparatuses for performing communication with external devices, digital image processing apparatuses to which the methods are applied, and communications systems including the digital image processing apparatuses.

2. Description of the Related Art

Many digital cameras, and more generally digital image processing apparatuses, need to communicate with external devices such as an external flash, a global positioning system (GPS) reception device, or the like. However, the number of external devices may be large so that it is not practical to have a separate communication port for each external device. Additionally, consumers often want digital cameras to be compact.

Additionally, the communication speeds amongst the external devices may be different. The communication speed with the external device needs to be at the right speed for the external device and for the digital camera. For example, a communication speed that is too slow may frustrate a user by taking too long to store a photograph. On the other hand, a communication speed that is too fast may interfere with the workings of the digital camera.

SUMMARY

Therefore, there is a need in the art for a method of controlling a digital image processing apparatus, the method comprising: connecting an external device to an interface; determining whether to perform single communication or burst communication; and performing the determined single or burst communication with the external device via the interface.

The determining whether to perform the single communication or the burst communication may comprise: determining an amount of data for communication; and determining whether to perform the single communication or the burst communication according to the amount of data.

The determining whether to perform the single communication or the burst communication may comprise: determining a type or a state of the external device; and determining whether to perform the single communication or the burst communication according to a result of the determining.

The determining of the type or the state of the external device may be performed based on information that is to be obtained by performing the single communication with the external device.

The determining whether to perform the single communication or the burst communication may comprise: determining whether the external device is a flash; when the external device is the flash, determining to perform the single communication; determining whether the external device is a GPS receiver; and when the external device is a GPS receiver, determining to perform the burst communication.

The determining whether to perform the single communication or the burst communication may comprise: determining whether external device comprises information to be transmitted to the digital image processing apparatus; and when the external device comprises the information to be transmitted, determining to perform the bust communication.

The determining whether to perform the single communication or the burst communication may comprise: determining a state of the digital image processing apparatus; and determining whether to perform the single communication or the burst communication according to a result of the determining.

The determining of the state of the digital image processing apparatus may comprise determining whether the digital image processing apparatus is in a photographing mode, and when the digital image processing apparatus is in the photographing mode, determining to perform single communication.

In the photographing mode, capturing of an image for recording or pre-processing an image before capturing the image may be performed.

The pre-processing may comprise at least one selected from the group consisting of auto-exposure (AE), auto-focusing (AF), and auto-white balancing (AWB).

In the single communication, there may be holding sections between clocks during a first frame.

There may be no holding section between clocks during a second frame in the burst communication.

The interface may be a serial peripheral interface (SPI).

The method may further comprise performing communication by performing the single communication or the burst communication, wherein the determining comprises determining whether to transition the one communication method being performed to the other communication method, and the performing of the determined single or burst communication with the external device may comprise performing communication with the external device using the other communication method when it is determined to transition the one communication method being performed.

The method may include connecting a second external device to the interface; determining whether to perform single communication or burst communication with the second external device; and performing the determined single or burst communication with the second external device via the interface.

According to another aspect of the invention, there is provided a digital image processing apparatus comprising: an interface via which the digital image processing apparatus is connected to an external device; a communication method determining unit for determining whether to perform single communication or burst communication; and a communication unit for performing the determined single communication or burst communication with the external device via the interface.

The communication method determining unit may comprise: a first determining unit for determining an amount of data for communication; and a communication method determining unit for determining whether to perform the single communication or the burst communication according to the amount of data.

The communication method determining unit may comprise: a second determining unit for determining a type or a state of the external device; and a communication method determining unit for determining whether to perform the single communication or the burst communication according to a result of the determining.

The second determining unit may determine the type or the state of the external device from information obtained by performing the single communication with the external device.

The communication method determining unit may comprise a third determining unit for determining whether the external device is a flash or a GPS receiver, and when the external device is a flash, the third determining unit may determine to perform the single communication, and when the external device is a GPS receiver, the third determining unit may determine to perform the burst communication.

The communication method determining unit may comprise: a fourth determining unit for determining whether information to be transmitted to the digital image processing apparatus is included the external device; and a communication method determining unit for determining to perform the burst communication when the information is included in the external device.

The communication method determining unit may comprise: a fifth determining unit for determining a state of the digital image processing apparatus; and a communication method determining unit for determining whether to perform the single communication or the burst communication according to a result of the determining.

The fifth determining unit may determine whether the digital image processing apparatus is in a photographing mode, and the communication method determining unit may determine to perform the single communication when the digital image processing apparatus is in the photographing mode.

In the photographing mode, capturing of an image for recording or pre-processing an image before capturing the image may be performed.

The pre-processing may comprise at least one selected from the group consisting of auto-exposure (AE), auto-focusing (AF), and auto-white balancing (AWB).

Holding sections may be between clocks during a first frame.

No holding section may be between clocks during a second frame in the burst communication.

The interface may be a serial peripheral interface (SPI).

While performing the single communication or the burst communication, the communication method determining unit may determine whether to transition from the one communication method being performed to the other communication method, and when it is determined to transition the communication method being performed, the communication unit may perform the other communication method with the external device.

The interface may further be configured to connect to a second external device; the communication method determining unit may further be configured to determine whether to perform single communication or burst communication with the second external device; and the communication unit may further be configured to perform the determined single communication or burst communication with the second external device via the interface while continuing to communicate with the external device.

According to another aspect of the invention, there is provided a communication system comprising: a digital image signal processing apparatus comprising a first interface, a communication method determining unit for determining whether to perform single communication or burst communication, and a first communication unit for performing communication with an external device via the first interface according to a result of the determining; and an external device comprising a second interface connected to the first interface, and a second communication unit for performing the determined communication via the second interface with the digital image processing apparatus.

The external device may comprise at least one selected from the group consisting of a flash, a GPS receiver, a wireless LAN device, and an external electronic view finder.

The first interface and the second interface may be serial peripheral interfaces (SPI).

The first interface and the second interface may be hot shoes.

BRIEF DESCRIPTION OF THE DRAWINGS

The above and other features and advantages of the invention will become more apparent by describing in detail exemplary embodiments thereof with reference to the attached drawings in which:

FIG. 11 is a waveform diagram of 8 byte communication;

FIG. 12 is a waveform diagram of burst communication;

FIGS. 13A through 13C are schematic views illustrating examples of a 1 byte communication structure;

FIGS. 14A and 14B are schematic views illustrating an example of an 8 byte communication structure;

FIGS. 15A and 15B are schematic views illustrating another example of an 8 byte communication structure; and FIGS. 16A through 16D are schematic views illustrating examples of burst communication structures.

DETAILED DESCRIPTION

Figure 1:
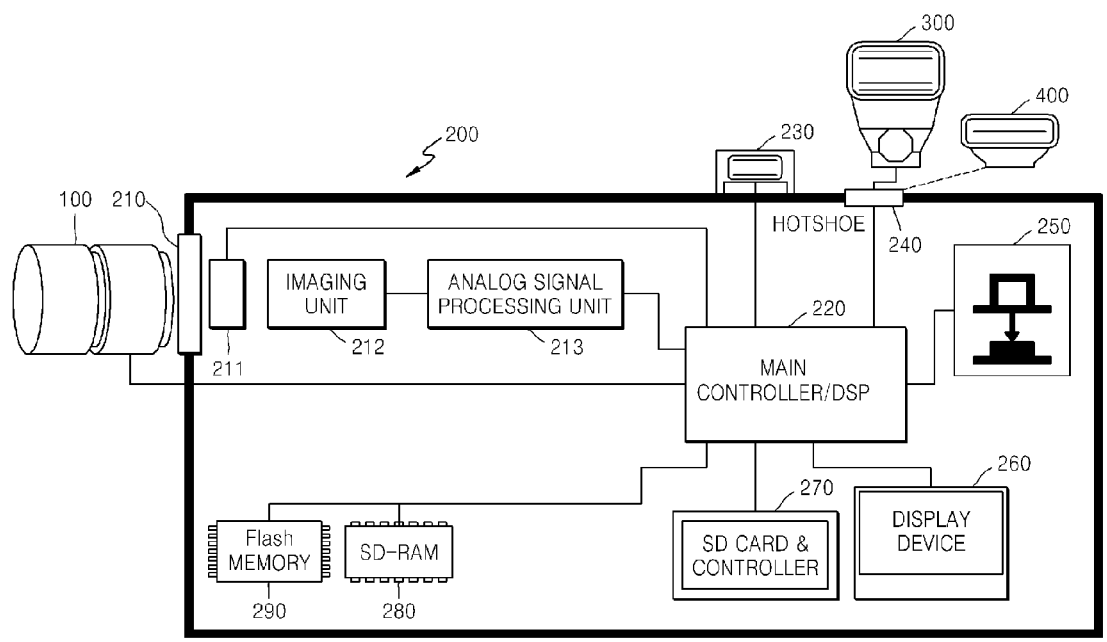
FIG. 1 is a block diagram illustrating a digital image processing apparatus according to an embodiment of the invention, for explaining a digital camera.

Hereinafter, embodiments of the invention will be described in detail with reference to the attached drawings. In the drawings, like reference numerals denote like elements.

FIG. 1 is a block diagram illustrating a digital image processing apparatus according to an embodiment of the invention, for explaining a digital camera. The embodiment described below includes many details which may vary according to different embodiments. In FIG. 1, an exchange lens digital camera is illustrated as the digital image processing apparatus, but is not limited thereto; the digital image processing apparatus may be any of other digital appliances such as a lens-integrated digital camera, a camera-mounted mobile phone, a personal digital assistant (PDA), a portable multimedia player (PMP), or the like.

First, the digital camera according to the current embodiment of the invention may include a lens unit 100 and a body 200 to which the lens unit 100 is mounted.

The lens unit 100 may include a lens for focusing an optical signal and an aperture for adjusting an amount of the optical signal. The presence of the lens may indicate that routines are performed based on focal length.

Elements of the digital image processing apparatus include at least one of a zoom lens for controlling a viewing angle to be narrower or wider according to a zoom and a focus lens for focusing on a focal point of a subject, and the lenses may each be formed as a single lens or may be formed as a group of lenses. In addition, the elements include optical driving members for adjusting a lens position, opening/closing the aperture, etc., to perform operations such as auto-focusing, auto-exposure adjustment, aperture adjustment, zooming, and focus changing. The optical driving members may include a controller that receives a control signal from a main controller/DSP 220 to control the optical driving members and that transmits a control signal transmitted from the main controller/DSP 220.

A lens coupling unit 210 may be formed in the body 200 to mount the lens unit 100. In addition, the body 200 includes a shutter 211 that controls an exposure of an imaging unit 212, that is, an imaging device. Here, the shutter 211 is illustrated as a mechanical shutter having an aperture capable of moving upward and downward, but the function of the shutter 211 may also be performed by controlling supply of an electrical signal to the imaging unit 212.

As described above, the body 200 includes the imaging unit 212, which receives an optical signal input through the lens unit 100 and converts the same into an electrical signal. The imaging unit 212 includes a photoelectric conversion device such as a charge-coupled device (CCD) sensor array, a complementary metal-oxide semiconductor (CMOS) sensor array, or the like.

The body 200 also includes an analog signal processing unit 213 that converts the electrical signal output from the photoelectric conversion device of the imaging unit 212 into a digital signal. In detail, the analog signal processing unit 213 may include a correlated double sampling/amplifier (CDS/AMP) that removes low frequency noise included in the output electrical signal and amplifies the electrical signal to a predetermined level at the same time. Also, an A/D converter for converting the electrical signal output by the CDS/AMP into a digital signal may be included. According to the current embodiment, the A/D converter is included in a separated block but is not limited thereto; for example, the A/D converter may be included in the main controller/DSP 220.

The body 200 also includes the main controller/DSP 220 for controlling an operation of the digital camera according to a program stored in a flash memory 290 or a manipulation signal of a manipulation unit 250.

In addition, the main controller/DSP 220 performs predetermined image signal processing for displaying or recording an image signal. For example, in order to convert an image signal into a form viewable by a person, the main controller/DSP 220 performs image signal processing such as gamma correction, color filter array interpolation, color matrix, color correction, color enhancement, or the like. Also, the main controller/DSP 220 performs resizing to adjust a size of an image.

The main controller/DSP 220 performs signal processing to perform a predetermined function. For example, signal processing for recognizing a desired scene or an object with respect to the image signal may be performed. That is, a desired scene or an object may be recognized using a color component, an edge component, or characteristic point information of the image signal. By recognizing a face of a subject from the image signal, a face area including the recognized face may be derived. Also, the image signal to which the image signal processing is performed is compressed or extended. In the case of compression, the image signal is compressed in a JPEG compression format or a H.264 compression format. An image file including image data generated by compression described above is transmitted and recorded to a secure digital (SD) card via an SD card controller.

In addition, the main controller/DSP 220 according to the current embodiment may perform auto-exposure (AE), auto-focusing (AF), or auto-white balancing (AWB). For example, when the user half-presses a shutter release button to enter the digital camera into a state S1, focusing values according to positions of the focus lens are derived to thereby determine a final focus position corresponding to an in-focus state.

Here, the above-described signal processing is performed by using the main controller/DSP 220 but is not limited thereto. According to operations, image signal processing may be designed to be performed in separate blocks.

Also, the main controller/DSP 220 performs communication with external devices such as an external flash or a GPS receiver 400 via a hot shoe 240. This will be described in detail with reference to drawings below.

The body 200 may further include an internal flash 230.

The body 200 includes the hot shoe 240 as an interface terminal to communicate with external devices. The body 200 and the external devices may perform serial peripheral interface (SPI) communication with each other via the hot shoe 240. SPI communication means synchronization communication in which the body 200, which is a master device, outputs a clock signal and transmits data in synchronization with the clock signal, and the external devices, which are slave devices, receive the data, as well as transmit data, according to the clock signal.

The body 200 includes the manipulation unit 250 for inputting a manipulation signal of the user. The manipulation unit 250 may include members to setup various settings when the user manipulates the digital camera or captures an image using the digital camera. The members may be implemented, for example, as a button, a key, a touch panel, a touch screen, or a dial, and may input manipulation signals of the user such as power on/off signals, photographing start/stop signals, replay start/stop/search signals, optical system operation signals, mode conversion signals, menu manipulation signals, and selection manipulation signals. For example, the shutter release button may be half-pressed, completely pressed, or released by the user. When the shutter release button is half-pressed (manipulation S1), a manipulation signal for initiating focus control is output, and the focusing controlling is finished when the half-pressing is released. The shutter release button may output a manipulation signal for initiating photographing when completely pressed (manipulation S2).

The manipulation signal may be transmitted to the main controller/DSP 220 or the like to drive a corresponding element according to the manipulation signal.

In addition, the body 200 includes a display device 260. The display device 260 may display an image or/and various data. For example, a liquid crystal display (LCD), a light-emitting diode (LED), and an organic light-emitting diode (OLED) may be mounted as the display device 260. The display device 260 may also be implemented as an electronic view finder, a dual display unit, or the like.

In addition, the body 200 includes an SD card as a recording medium for recording various data such as image files, and an SD card controller 270. The SD card controller 270 may control recording of image data to the SD card or reading of previously stored image data, setup information, or the like. Here, the body 200 includes the SD card as a storage device but other semiconductor memory media may be included as the storage device. Alternatively, an optical disk such as a CD, a DVD, or a blu-ray disk, a magneto-optical disk, a magnetic disk, etc., may be used.

Also, the body 200 may include a synchronous digital random access memory (SDRAM) 280 as a buffer memory for temporarily storing data. Alternatively, a DRAM may be used instead of the SDRAM 280.

The body 200 may include the flash memory 290 for storing operation systems (OS) or application programs needed to operate the digital camera. Not only the flash memory 290 but also an electrically erasable programmable read only memory (E2PROM) or a read only memory (ROM) may be used as a program storage unit.

Figure 2:
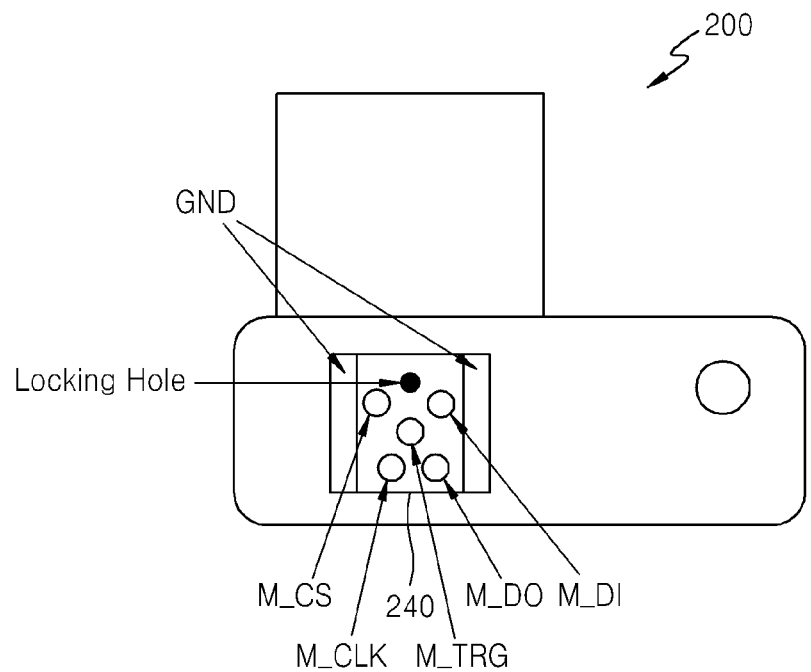
FIG. 2 is a schematic view illustrating a body of the digital image processing apparatus illustrated in FIG. 1 according to an embodiment of the invention, for explaining a serial peripheral interface (SPI) communication pin of the digital processing apparatus.
Figure 3:
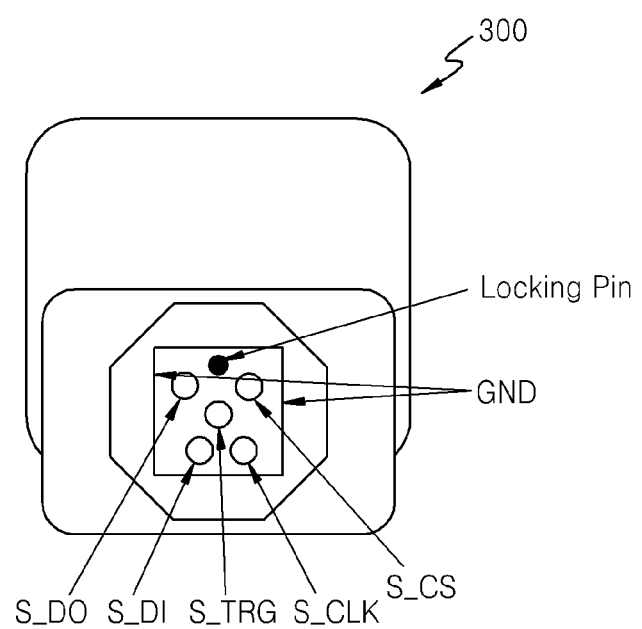
FIG. 3 is a schematic view of an external device connected to the SPI communication pin of the digital image processing apparatus illustrated in FIG. 2.

FIG. 2 illustrates the body 200 according to an embodiment of the invention, for explaining a pin for SPI communication. FIG. 3 is a schematic view of an external device connected to the SPI communication pin of the body 200 illustrated in FIG. 2, for explaining a communication pin. In the current embodiment, a hot shoe is illustrated as an interface with which the body 200 of the digital camera communicates with an external device, which is illustrated as an external flash 300.

First, referring to FIG. 2, SPI communication terminals for transmitting/receiving data and trigger terminals for transmitting a trimming signal are included in the hot shoe 240 of the body 200, which is a master device. In detail, a chip select terminal M_CS for SPI communication, a clock terminal M_CLK, a data input terminal M_DI, and a data output terminal M_DO are included in the hot shoe 240. Also, a trigger terminal M_TRG for transmitting a trimming signal may be included in the hot shoe 240. Also, a locking hole is included as a coupling portion to couple the body 200 to an external device.

A hot shoe terminal of the external flash 300, which is an example of the external device coupled to the body 200, will be described with reference to FIG. 3. Referring to FIG. 3, the external flash 300 as a slave device also includes a chip select terminal S_CS for SPI communication, a clock terminal S_CLK, a data input terminal S_DI, and a data output terminal S_DO. The external flash 300 also includes a trigger terminal S_TRG for transmitting a trigger signal. For example, a flash device may be notified of a timing for light emission via the trigger terminal S_TRG.

Figure 4:
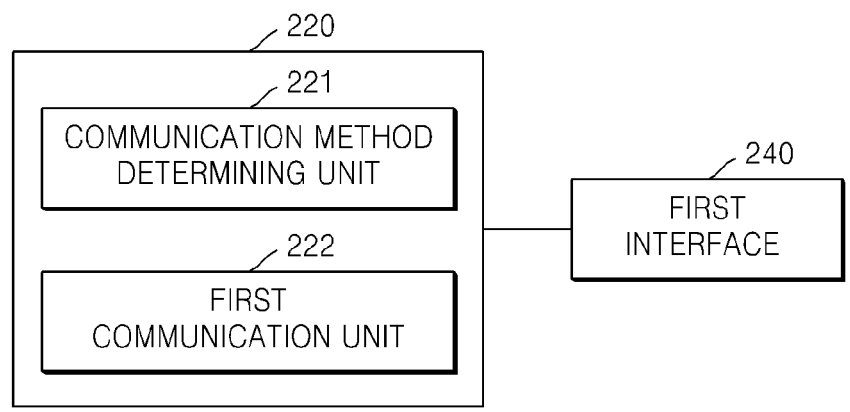
FIG. 4 is a schematic view illustrating a main controller of the digital image processing apparatus illustrated in FIG. 1 according to an embodiment of the invention.

FIG. 4 is a schematic view illustrating the main controller/CPU 220 of the digital image processing apparatus illustrated in FIG. 1, according to an embodiment of the invention.

Referring to FIG. 4, the main controller/CPU 220 includes a communication method determining unit 221 for determining whether to perform single communication or burst communication and a first communication unit 222 for performing communication with an external device using the communication method determined by the communication method determining unit 221.

The digital image processing apparatus is connected to the external device via a first interface, for example, the above-described hot shoe 240, and the first communication unit 222 may perform transmission/reception of data with the external device via the first interface 240.

Figure 5:
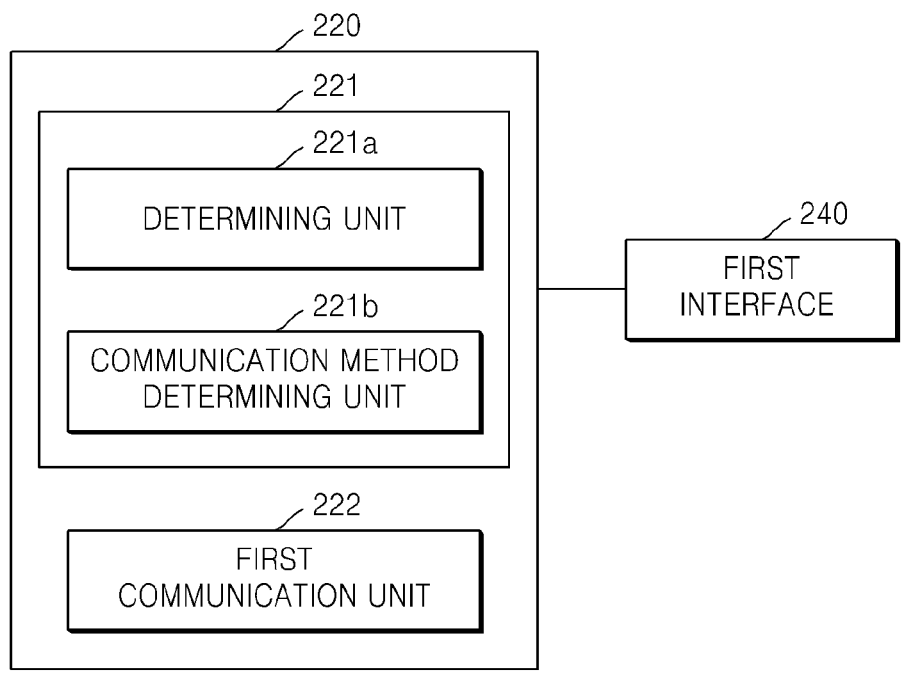
FIG. 5 is a schematic view illustrating a main controller of the digital image processing apparatus illustrated in FIG. 1 according to another embodiment of the invention.

FIG. 5 is a schematic view illustrating the main controller/CPU 220 of the digital image processing apparatus illustrated in FIG. 1 according to another embodiment of the invention.

Referring to FIG. 5, the main controller/CPU 220 may include the communication method determining unit 221 and the first communication unit 222.

The communication method determining unit 221 includes a determining unit 221*a* for determining whether predetermined conditions are satisfied, and a communication method determining unit 221*b* for determining the communication method to be single communication or burst communication according to whether the conditions are satisfied.

Burst communication refers to a method in which data in units of previously set bursts are continuously transmitted when performing SPI communication (full duplex communication) during one frame. By generating clock signals that are continuous during one frame, the data may be transmitted continuously. On the other hand, single communication refers to a mode in which clock signals having holding sections arranged in units of, for example, 1 byte, are generated, and the data may be sequentially transmitted/received in synchronization with the clock signals. These communication methods will be described later in detail with reference to drawings.

For example, the determining unit 221*a* may determine an amount of data to be continuously transmitted. In detail, the determining unit 221*a* determines whether the amount of data is greater than a predetermined standard; if so, the communication method determining unit 221*b* may determine that burst communication is to be performed; if not, the communication method determining unit 221*b* may determine that single communication is to be performed. For example, when the digital camera is currently performing single communication with an external device, and an amount of data to be transmitted is greater than the predetermined standard, the communication method determining unit 221*b* may transition the communication method to burst communication. Also, when the digital camera is currently performing burst communication with an external device, and an amount of data to be transmitted is less than the predetermined standard, the communication method determining unit 221*b* may transition the communication method to single communication.

For another example, the determining unit 221*a* may determine a type or a state of an external device. In detail, the determining unit 221*a* may determine whether the external device transmits/receives a small amount of data, such as a flash, or transmits/receives a large amount of data, such as a GPS receiver. For example, the determining unit 221*a* may determines whether the external device is a flash, by performing single communication as 1 byte communication, and if the external device is not a flash, the determining unit 221*a* may determine whether the external device is a GPS receiver, by performing 8 byte communication. Accordingly, information about the type or the state of the external device may be obtained. The information about the type or the state of the external device may be obtained by the first communication unit 222 by performing single communication with the external device. When the external device is determined to be a flash, the communication method determining unit 221*b* may determine that single communication is to be performed, and when the external device is determined to be a GPS receiver, the communication method determining unit 221b may determine that burst communication is to be performed.

According to another example, the determining unit 221a may determine whether an external device includes data to be transmitted to the digital image processing apparatus. Since a two-way serial communication method is used in the current embodiment, the first communication unit 222 of the body 200 may obtain information on whether the external device includes data to be transmitted to the digital image processing apparatus. When it is determined that the external device includes data to be transmitted to the digital image processing apparatus, the communication method determining unit 221b may determine that burst communication is to be performed. In detail, when it is determined that the external device includes data to be transmitted to the digital image processing apparatus while performing single communication in realtime, the communication method may be changed to burst communication. For example, when position data is updated in a GPS receiver, this corresponds to a case in which the GPS receiver includes data to be transmitted to the digital image processing apparatus, and thus the communication method may be transitioned to burst communication to transmit updated data. Alternatively, single communication or burst communication may be performed when a wireless LAN device is mounted as an external device or when the wireless LAN device receives data or according to an amount of received data.

For another example, the determining unit 221a may determine a state of the digital camera. The digital camera may be in, for example, a photographing mode. The photographing mode is a mode in which communication with an external device may not be necessary. In detail, the digital camera may be in a photographing mode in which auto-focusing (AF) is performed. Alternatively, the digital camera may be in a photographing mode in which auto-exposure (AE) or auto-white balancing (AWB) is performed. When a GPS receiver is mounted as the external device, single communication is performed. When new position data is received and updated in the GPS receiver, the communication method may be transitioned from single communication to burst communication to transmit the updated position data to the digital camera. However, when the digital camera is entered into the state S1 as the user half-presses the shutter release button of the body 200, so that no overload is applied to the body 200, the communication method may not be transitioned to burst communication and the updated position data may be received while performing single communication.

Figure 6:
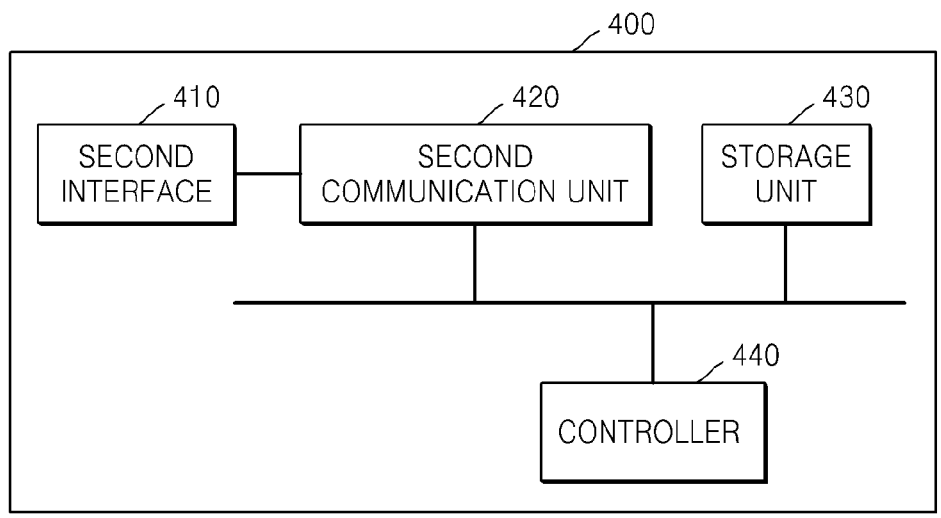
FIG. 6 is a block diagram illustrating an external device connected to the digital image processing apparatus illustrated in FIG. 1 according to an embodiment of the invention.

FIG. 6 is a block diagram illustrating an external device connected to the digital image processing apparatus illustrated in FIG. 1 according to an embodiment of the invention. The external device connected to the above-described digital image processing apparatus will be described here, and a communication system according to an embodiment of the invention may include the above-described digital image processing apparatus and the external device and will be described later.

Referring to FIG. 6, the GPS receiver 400 is illustrated as the external device. The GPS receiver 400 includes a second interface 410 via which the GPS receiver 400 is connected to the body 200 of the digital camera and a second communication unit 420 that receives position data from a GPS satellite and transmits the position data to the body 200 via the second interface 410. The second interface 410 may include terminals for SPI communication and trigger terminals as illustrated in FIG. 3, and is connected to the first interface 240 of the body 200. In synchronization with a clock received from the first communication unit 222 of the body 200, which is a master device, the second communication unit 420 transmits necessary data to the first communication unit 222 and also receives data in synchronization with the clock. When performing data transmission/reception, burst communication, in which data may be transmitted/received in synchronization with continuous clocks without a holding section between the clocks during a frame, or single communication, in which data is transmitted/received in synchronization with clocks periodically separated by holding sections during a frame, may be performed. Whether to perform burst communication or single communication in the GPS receiver 400 is determined by the first communication unit 222 of the body 200 as described above.

While the GPS receiver 400 is described as the external device in the current embodiment, the external device is not limited thereto. The external device may also be a flash, a wireless LAN device, an external electronic view finder, or the like. Each of these devices may include a second interface to be commonly connected to the first interface 240 of the body 200 and a second communication unit for performing two-way serial communication with the first communication unit 222. When necessary, a storage unit and a controller may be further included, and a predetermined element may be further included according to characteristics of an external device; for example, a light emitting unit may be further included in a flash.

Figure 7:
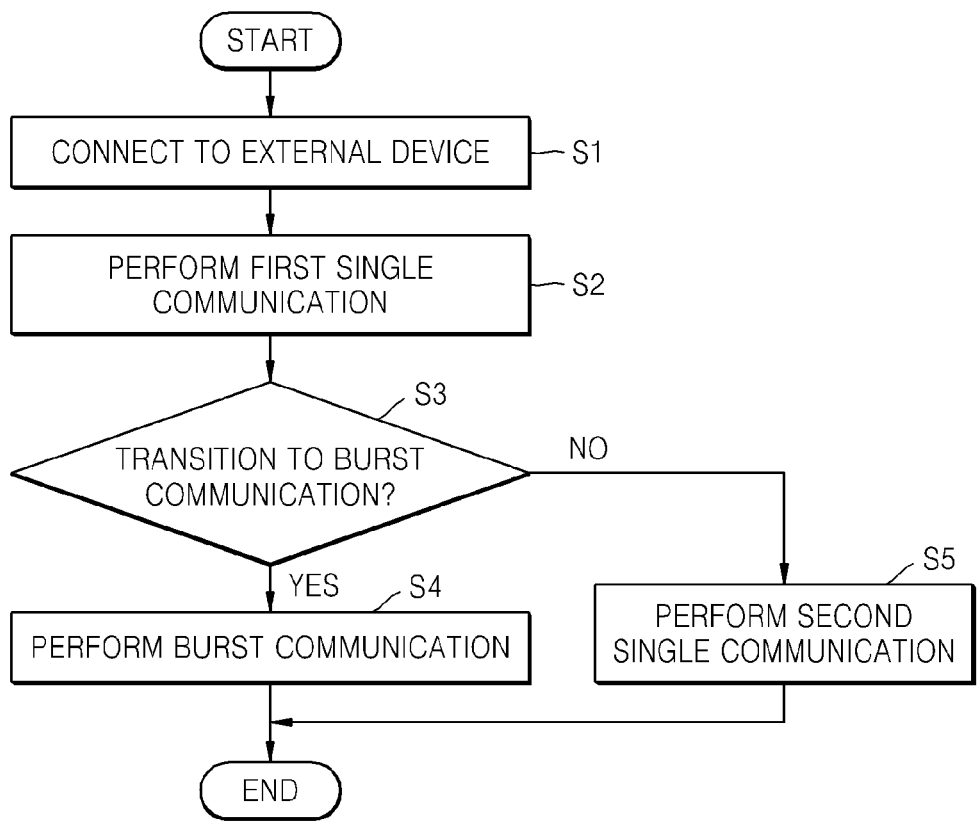
FIG. 7 is a flowchart illustrating a method of controlling a digital image processing apparatus according to an embodiment of the invention.

FIG. 7 is a flowchart illustrating a method of controlling a digital image processing apparatus according to an embodiment of the invention.

Referring to FIG. 7, an external device is connected to an interface of the digital image processing apparatus, for example, a hot shoe of a digital camera, in operation S1. The interface has a structure via which a plurality of external devices may be connected to the digital image processing apparatus and is appropriate for digital image processing apparatuses such as digital cameras, which are becoming increasingly compact.

In operation S2, first single communication is performed. For example, when the digital image processing apparatus is turned on and the external device is connected to the digital image processing apparatus, first single communication may be performed by default. Accordingly, for example, information about whether the external device is operating, information about whether the external device is powered on, or information about whether the external device is a flash or the like may be obtained.

In operation S3, whether the communication method is to be transitioned to burst communication is determined. When the digital image processing apparatus is designed to perform burst communication when predetermined conditions are satisfied, operation S3 may correspond to determining whether the above conditions are satisfied. The conditions may be, for example, those described with reference to FIG. 5. When the conditions are satisfied, burst communication is performed in operation S4. When the above conditions are not met, second single communication is performed in operation S5.

Figure 8:
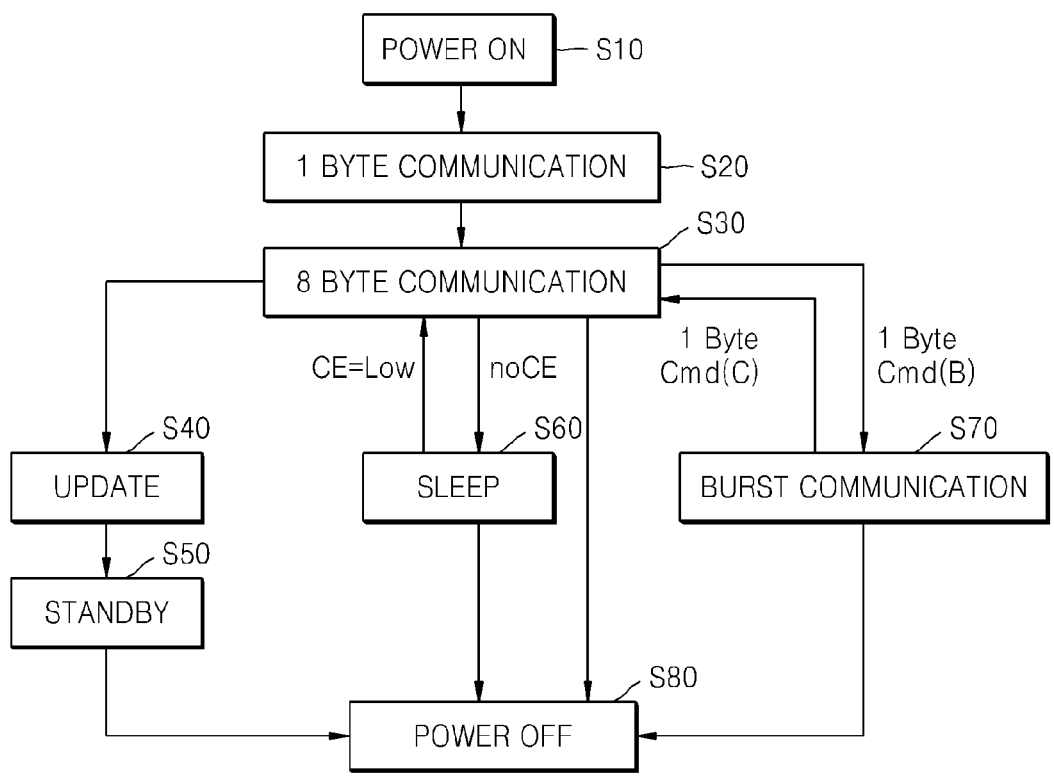
FIG. 8 is a schematic view illustrating an overall operating method of a digital image processing apparatus according to an embodiment of the invention.

FIG. 8 is a schematic view illustrating an overall operating method of a digital image processing apparatus according to an embodiment of the invention, for explaining communication transition.

Referring to FIG. 8, when the digital image processing apparatus is turned on in operation S10, first single communication is performed as 1 byte communication with an external device in operation S20. Referring to FIGS. 13A through 13C, information about a start or an end of a communication, information about a state of the communication, or information about transition of the state of the communication, such as "data notifying a start of burst communication", "information notifying a start of second single communication, for example, 8 byte communication", or "information notifying data update from the external device", may be transferred while performing 1 byte communication.

As single communication is set by default, in which substantially necessary data is transmitted and received, second single communication, for example, 8 byte communication, is performed to transmit or receive data in operation S30. As an example of 8 byte communication, referring to FIGS. 14A and 14B, a command for controlling powering ON/OFF of an external device, a command for resetting a system of the external device, a command for changing a sleep mode, or "selection of actual data and transmission thereof" may be performed. For another example, an amount of data to be transmitted via 8 byte communication may be checked as illustrated in FIGS. 15A and 15B.

In detail, in operation S40, actual data may be transmitted or receive in 8 byte communication, and in operation S50, a standby mode may be set after transmitting or receiving necessary data. If no data is transmitted or received for a predetermined period of time, a sleep mode is entered in operation S60. When a control signal (CE) is generated in the sleep mode at least once, 8 byte communication is performed again in operation S30.

Then, information used to determine whether predetermined conditions for 8 byte communication are satisfied is received, and a command directing to perform burst communication based on the information is transmitted in 1 byte communication (B) to thereby transition to burst communication in operation S70. Alternatively, information notifying an end of burst communication may be transmitted in 1 byte communication (C) to return to 8 byte communication in operation S30. Examples of data structures being transmitted or received in burst communication are as shown in FIGS. 16A through 16D. In detail, referring to FIG. 16A, from a fifth byte, actual data may be continuously transmitted according to a previously set burst length, and actual data may be transmitted according to a maximum burst unit after the fifth byte.

While performing the operations described above, when a control signal directing to turn off the digital image processing apparatus is generated, for example, by the user, the digital image processing apparatus may be turned off in operation S80.

According to the current embodiment, single communication for transmitting or receiving data with an external device is set by default, and when predetermined conditions are satisfied, the communication method is transitioned to burst communication. However, the embodiment is not limited thereto, and the communication method may be transitioned to single communication after burst communication, and based on information obtained from 1 byte communication, whether to further perform 1 byte communication, 8 byte communication, or burst communication may be immediately determined.

Figure 9:
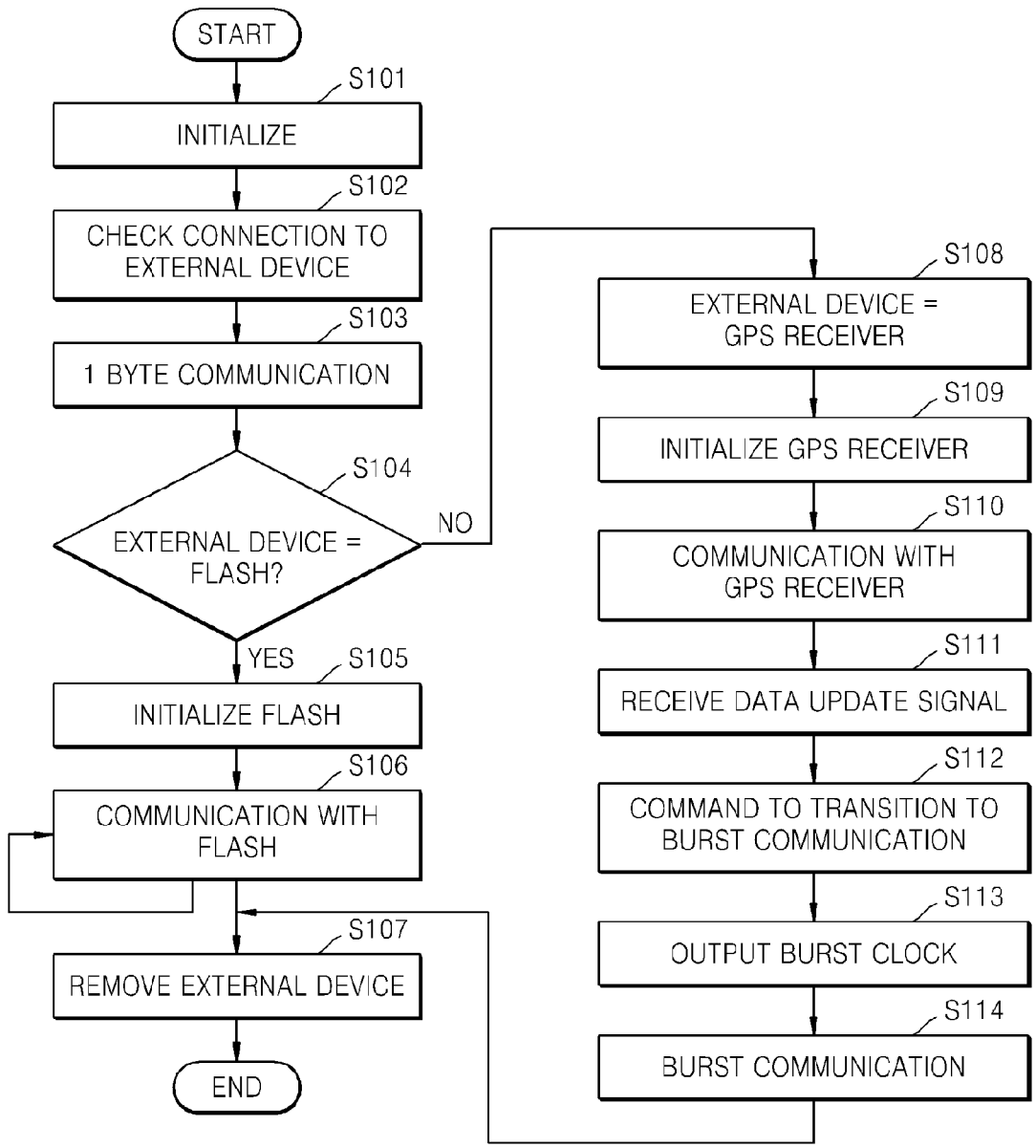
FIG. 9 is a flowchart illustrating a method of controlling a digital image processing apparatus according to another embodiment of the invention.
Figure 10:
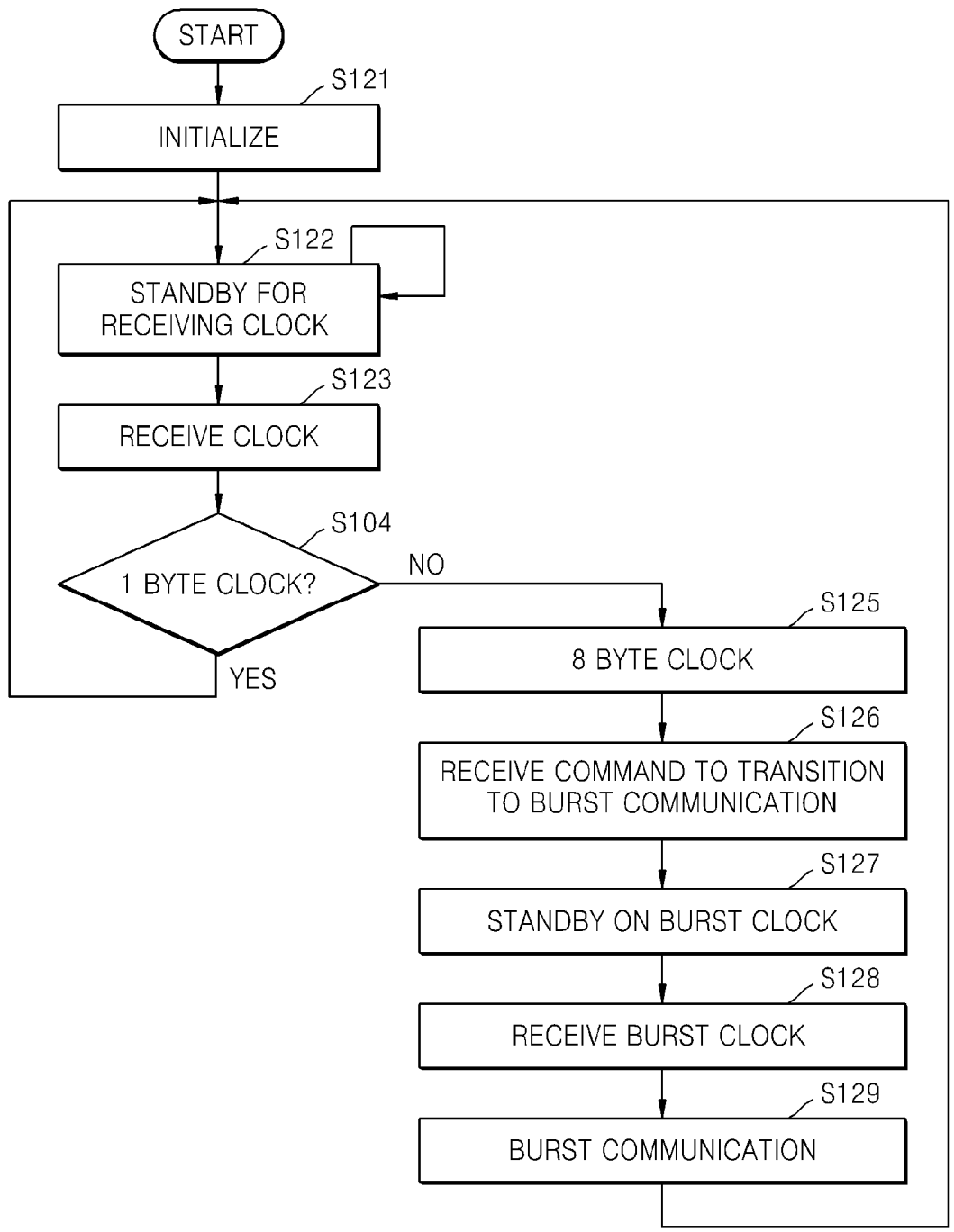
FIG. 10 is a flowchart illustrating a method of controlling an external device connected to a digital image processing apparatus according to an embodiment of the invention, with reference to the method of FIG. 9.

FIG. 9 is a flowchart illustrating a method of controlling a digital image processing apparatus according to another embodiment of the invention. FIG. 10 is a flowchart illustrating a method of controlling an external device connected to a digital image processing apparatus according to an embodiment of the invention, with reference to the method of FIG. 9.

Referring to FIGS. 9 and 10 together, first, the digital image processing apparatus is initialized in operation S101, and whether an external device is connected to the digital image processing apparatus is checked in operation S102. On the other hand, referring to FIG. 10, the external device is initialized in operation S21, and the external device is on standby for receiving a clock signal from the digital image processing apparatus, which is a master device, in operation S122.

Referring to FIG. 9 again, the digital image processing apparatus performs first single communication set by default. For example, 1 byte communication is performed in operation S103. That is, the digital image processing apparatus generates a 1 byte clock signal and transmits the same to the external device. Referring to FIG. 10, the external device receives the 1 byte clock signal and performs an operation corresponding to the clock signal in operation S123. Referring to FIG. 9, the digital image processing apparatus receives first information indicating that the external device performed the corresponding operation, and may determine a type of the external device based on the received first information in operation S104. For example, whether the external device is a flash may be determined. When the external device is a flash, the flash is initialized in operation S105. In operation S106, 1 byte communication is performed with the flash to obtain necessary data from the flash. When the flash is removed in operation S107, communication with the flash is ended. Referring to FIG. 10, after receiving the 1 byte clock signal, it is determined whether it is the 1 byte clock signal in operation S104, and if so, the external device is on standby for receiving a clock signal from the digital image processing apparatus, which is a master device, in operation S122 to further perform 1 byte communication.

Referring to FIG. 9, when it is determined that the external device is not a flash in operation S104, since it is determined that the external device is a GPS receiver, 8 byte communication is performed in operation S108. According to the current embodiment, an interface via which two external devices—a flash and a GPS receiver—are commonly connected, is illustrated. However, the current embodiment is not limited thereto, and at least three external devices may be connected to a single interface.

Referring to FIG. 9 again, when the external device is a GPS receiver, the GPS receiver is initialized in operation S109 to receive position data. In other words, for initialization for reception of position data from the GPS receiver, an 8 byte clock signal is generated and transmitted to the external device. Accordingly, 8 byte communication is performed with the GPS device in operation S110. Referring to FIG. 10, the external device receives the 8 byte clock signal in operation S125. FIG. 11 is a waveform diagram illustrating a frame signal, a clock signal, and a data input/output signal of 8 byte communication. When there are holding sections between clocks every 8 bytes in 8 byte communication, data is transmitted in synchronization with the 8 byte clock signal.

When position data is updated in the GPS receiver, information indicating that the position data is updated is received from the external device via 8 byte communication in operation S111. In operation S112, the digital image processing apparatus gives a command to transition the communication method to burst communication based on the information indicating that the GPS device is updated. The command directing to transition the communication method to burst communication may also be given via 8 byte communication. Referring to FIG. 10, the external device receives the command directing to transition the communication method to burst communication in operation S126, and the external device is on standby for receiving a burst clock signal in operation S127.

Referring to FIG. 9, the digital image processing apparatus outputs a burst clock signal capable of transmitting an amount of data having a preset length in operation S113. The burst clock signal does not include a holding section between clocks during one frame so as to continuously transmit the preset amount of data. For example, FIG. 12 is a waveform diagram illustrating burst communication for continuously transmitting 4 byte data; here, 32 clocks are continuously generated without a holding section during one frame (a LOW section of CS). Referring to FIG. 10, the external device receives the burst clock signal in operation 128.

In operations S114 and S129, the digital image processing apparatus and the external device respectively perform burst communication with each other.

In the above-described embodiments, the external flash and the GPS device are described as the external devices of the digital camera but the embodiments are not limited thereto. The external devices may be various external devices such as a wireless LAN device.

According to the invention, a method of controlling a digital image processing apparatus, in which when an amount of data to be communicated with an external device is great, a communication method may be transitioned to burst communication, a digital image processing apparatus to which the method is applied, and a communication system including the digital image processing apparatus may be provided. In detail, the method may be a method of controlling a digital image processing apparatus including a single interface for communicating with a plurality of external device, in which, according to a type or a state of an external device or an operating state of the digital image processing apparatus, when an amount of data to be transmitted is great, burst communication may be performed, and if the amount of data is not so great, single communication may be performed.

The invention can also be embodied as computer readable codes on a computer readable recording medium. The computer readable recording medium is any data storage device that can store data which can be thereafter read by a computer system. The computer readable medium may be non-transitory.

Examples of the computer readable recording medium include read-only memory (ROM), random-access memory (RAM), CD-ROMs, magnetic tapes, floppy disks, optical data storage devices, etc. The invention can also be embodied as computer readable code on a computer readable recording medium. The computer readable recording medium can also be distributed over network coupled computer systems so that the computer readable code is stored and executed in a distributed fashion. This media can be read by the computer, stored in the memory, and executed by the processor. The invention can also be embodied as computer readable code on a computer readable recording medium. The computer readable recording medium is any data storage device that can store data which can be thereafter read by a computer system.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the current specification are merely used to describe particular embodiments, and are not intended to limit the invention. An expression used in the singular encompasses the expression of the plural, unless it has a clearly different meaning in the context. In the current specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the invention.

All references, including publications, patent applications, and patents, cited herein are hereby incorporated by reference to the same extent as if each reference were individually and specifically indicated to be incorporated by reference and were set forth in its entirety herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of controlling a digital image processing apparatus, the method comprising:
   connecting an external device to an interface;
   determining whether the external device is a flash;
   if the external device is the flash, determining to perform single communication;
   determining whether the external device is a GPS receiver;

if the external device is a GPS receiver, determining to perform burst communication; and
performing the determined single or burst communication with the external device via the interface.

2. The method of claim 1, further comprising:
determining an amount of data for communication; and
determining whether to perform the single communication or the burst communication according to whether the external device sends or receives at least the amount of data for communication.

3. The method of claim 1, further comprising:
determining a type or a state of the external device; and
determining whether to perform the single communication or the burst communication according the determined type or state.

4. The method of claim 3, wherein the determining of the type or the state of the external device is performed based on information that is to be obtained by performing the single communication with the external device.

5. The method of claim 1, further comprising:
determining whether the external device comprises information to be transmitted to the digital image processing apparatus; and
if the external device comprises the information to be transmitted, determining to perform the burst communication.

6. The method of claim 1, further comprising:
determining a state of the digital image processing apparatus; and
determining whether to perform the single communication or the burst communication according to a result of the determined type or state.

7. The method of claim 6, further comprising:
determining whether the digital image processing apparatus is in a photographing mode; and
if the digital image processing apparatus is in the photographing mode, determining to perform the single communication.

8. The method of claim 7, wherein, in the photographing mode, capturing of an image for recording or pre-processing an image before capturing the image is performed.

9. The method of claim 8, wherein the pre-processing comprises at least one selected from the group comprising: auto-exposure (AE), auto-focusing (AF), and auto-white balancing (AWB).

10. The method of claim 1, wherein, in the single communication, there are holding sections between clocks during a first frame.

11. The method of claim 1, wherein there is no holding section between clocks during a second frame in the burst communication.

12. The method of claim 1, wherein the interface is a serial peripheral interface (SPI).

13. The method of claim 1, further comprising:
determining whether to transition the one communication method being performed to the other communication method,
wherein the performing of the determined single or burst communication with the external device comprises performing communication with the external device using the other communication method if it is determined to transition the one communication method being performed.

14. The method of claim 1, further comprising:
connecting a second external device to the interface;
determining whether to perform single communication or burst communication with the second external device; and
performing the determined single or burst communication with the second external device via the interface.

15. A digital image processing apparatus comprising:
an interface configured to connect to an external device;
a communication method determining unit configured to determine whether to perform single communication or burst communication, wherein the communication method determining unit comprises:
a determining unit for
determining whether the external device is a flash or a GPS receiver;
if the external device is a flash, determining to perform the single communication, and if the external device is a GPS receiver, determining to perform the burst communication; and
a communication unit configured to perform the determined single communication or burst communication with the external device via the interface.

16. The digital image processing apparatus of claim 15, wherein
the determining unit is further configured to determine an amount of data for communication; and
the communication method determining unit is further configured to determine whether to perform the single communication or the burst communication according to the amount of data.

17. The digital image processing apparatus of claim 15, wherein
the determining unit configured to determine a type or a state of the external device; and
the communication method determining unit is further configured to determine whether to perform the single communication or the burst communication according to the type or state of the external device.

18. The digital image processing apparatus of claim 17, wherein the type or the state of the external device is determined from information obtained by performing the single communication with the external device.

19. The digital image processing apparatus of claim 15, wherein
the determining unit is further configured to determine whether information to be transmitted to the digital image processing apparatus is included in the external device; and
the communication method determining unit is further configured to determine to perform the burst communication if the information is included in the external device.

20. The digital image processing apparatus of claim 15, wherein
the determining unit is further configured to determine a state of the digital image processing apparatus; and
the communication method determining unit is further configured to determine whether to perform the single communication or the burst communication according to the state of the digital image processing apparatus.

21. The digital image processing apparatus of claim 20, wherein the determining unit is further configured to determine whether the digital image processing apparatus is in a photographing mode, and the communication method determining unit is further configured to perform the single communication if the digital image processing apparatus is in the photographing mode.

22. The digital image processing apparatus of claim 21, wherein, in the photographing mode, capturing of an image for recording or pre-processing an image before capturing the image is performed.

23. The digital image processing apparatus of claim 22, wherein the pre-processing comprises at least one selected from the group comprising auto-exposure (AE), auto-focusing (AF), and auto-white balancing (AWB).

24. The digital image processing apparatus of claim 15, wherein holding sections are between clocks during a first frame.

25. The digital image processing apparatus of claim 15, wherein there is no holding section between clocks during a second frame in the burst communication.

26. The digital image processing apparatus of claim 15, wherein the interface is a serial peripheral interface (SPI).

27. The digital image processing apparatus of claim 15, wherein while performing the single communication or the burst communication, the communication method determining unit is configured to determine whether to transition from the one communication method being performed to the other communication method, and if it is determined to transition the communication method being performed, the communication unit performs the other communication method with the external device.

28. The digital image processing apparatus of claim 15, wherein
the interface is further configured to connect to a second external device;
the communication method determining unit is further configured to determine whether to perform single communication or burst communication with the second external device; and
the communication unit is further configured to perform the determined single communication or burst communication with the second external device via the interface while continuing to communicate with the external device.

29. A communication system comprising:
a digital image signal processing apparatus comprising a first interface, a communication method determining unit configured to
determine whether the external device is a flash;
if the external device is the flash, determine to perform single communication;
determine whether the external device is a GPS receiver; and
if the external device is a GPS receiver, determine to perform burst communication;
a first communication unit configured to perform communication with an external device via the first interface according to a result of the determining; and
an external device comprising a second interface connected to the first interface, and a second communication unit configured to perform the determined communication via the second interface with the digital image processing apparatus.

30. The communication system of claim 29, wherein the external device comprises at least one selected from the group comprising a flash, a GPS receiver, a wireless LAN device, and an external electronic view finder.

31. The communication system of claim 29, wherein the first interface and the second interface are serial peripheral interfaces (SPI).

32. The communication system of claim 29, wherein the first interface and the second interface are hot shoes.

* * * * *